INVENTORS:
Robert J. Hengstebeck
Maurice F. Oxenreiter
BY
ATTORNEY

United States Patent Office 2,776,248
Patented Jan. 1, 1957

2,776,248

HYDROCARBON REFORMING WITH FLUIDIZED PLATINUM AND HEATING SYSTEM THEREFOR

Robert J. Hengstebeck, Valparaiso, and Maurice F. Oxenreiter, Hammond, Ind., assignors to Standard Oil Company, Chicago, Ill., a corporation of Indiana Application May 19, 1953, Serial No. 356,036

10 Claims. (Cl. 196—50)

This invention relates to hydrocarbon reforming with fluidized platinum catalyst and it pertains more particularly to an improved method and means for supplying heat thereto.

For the past ten years naphtha has been reformed by the so-called hydroforming process which employs a molybdena-on-alumina or chromia-on-alumina catalyst in fixed bed operations and recently a fluid hydroformer has been developed for employing this type of catalyst. Also in recent years the so-called platforming process has been adopted by many refiners, this process being characterized by the use of a fluorine-containing platinum-on-alumina catalyst at pressures of at least about 500 p. s. i. g. and being non-regenerative in nature in that reactors are onstream for months and after each on-stream period the spent catalyst is replaced by fresh, active catalyst. The endothermic heat of reforming in the case of platinum catalysts is very much greater than that encountered in the molybdena-on-alumina catalyst so that platforming processes have all been carried out in fixed bed units with reheaters between the several stages of operation. The problem of supplying sufficient heat to a fluidized reactor has been an important factor in preventing platinum type catalysts from being employed in fluidized systems. An object of this invention is to provide an improved method and means for supplying such heat of reaction. A further object is to provide an improved fluidized platinum catalyst reforming system which incorporates both regeneration and rejuvenation facilities as well as an improved method and means for supplying endothermic heat of reaction. Other objects will be apparent as the detailed description of the invention proceeds.

It has been proposed to supply the endothermic heat of reaction in fluidized platinum reforming systems by indirect heat exchange in the reactor, but no commercially attractive process has been devised along this line. It has even been proposed that the required heat be supplied by raining hot shot or pebbles through the reactor but this obviously creates serious mechanical difficulties and handling problems. Superheating a gas or product recycle stream is not desirable because of volumes of such gases that would be required. Direct firing is subject to the disadvantage of the adverse effect of extremely high skin temperatures.

By this invention the heat transfer problem is solved by circulating large amounts of the catalyst in fluidized condition and at rapid rate in indirect heat exchange relationship with a body of fluidized solids which, in turn, is heated to a temperature of about 1200° F. by direct combustion of fuel and air. The fluidized solids heating zone may operate at substantially atmospheric pressure and, due to the remarkable heat conductivity of a fluidized solids bed, the temperature is substantially identical in all parts of the bed, i. e. it can be held at about 1200° F. which does not give an injuriously high skin temperature. The tubes through which the catalyst circulates in the heating zone must, of course, be relatively thick walled to withstand reactor pressure but the heat transfer coefficient is adequate to give effective heat input and conductivity may be increased by providing the tubes with vertical fins. The fluidized solids in the heater may be inert particles such as sand about 2 to 200 microns in particle size although the particles may contain a combustion catalyst for minimizing coke deposition.

By operating the reactor at about 200 p. s. i. g. and about 940° F., remarkably high yields of very high octane number product are obtainable if the platinum catalyst is maintained in a state of high activity and high selectivity. This, in turn, is accomplished by a combination regeneration and rejuvenation step at substantially conversion pressure at a temperature of about 1000° F. to 1300° F. by heating the oxygen-containing gas employed for effecting regeneration and employing a sufficient amount of oxygen or air to provide an oxygen partial pressure greater than .4 atmosphere and preferably more than 1 atmosphere. The regenerator-rejuvenator vessel is preferably superimposed on the reactor so that the catalyst may be conveyed by a flue gas stream through a vertical conduit from the lower part of the reactor to a low point in the rejuvenator-regenerator. A second vertical conduit provides a return line for rejuvenated catalyst from about the dense phase level in the upper vessel to a point within the dense phase of the reactor. Solids are filtered out of the high pressure flue gas leaving the regenerator-rejuvenator vessel and a portion of this high pressure flue gas is cooled, compressed, heated and utilized for transporting catalyst to the regenerator-rejuvenator vessel. Enough fuel gas may be introduced with air at the base of the regenerator-rejuvenator to maintain the desired temperature therein since ordinarily the amount of carbonaceous deposit on the catalyst is insufficient for that purpose.

The invention will be more clearly understood from the following specific example read in conjunction with the accompanying drawing which is a schematic flowsheet of a 9,000 barrel per day naphtha reforming plant employing fluidized platinum catalyst. In the drawings—

Figures 1, 2:
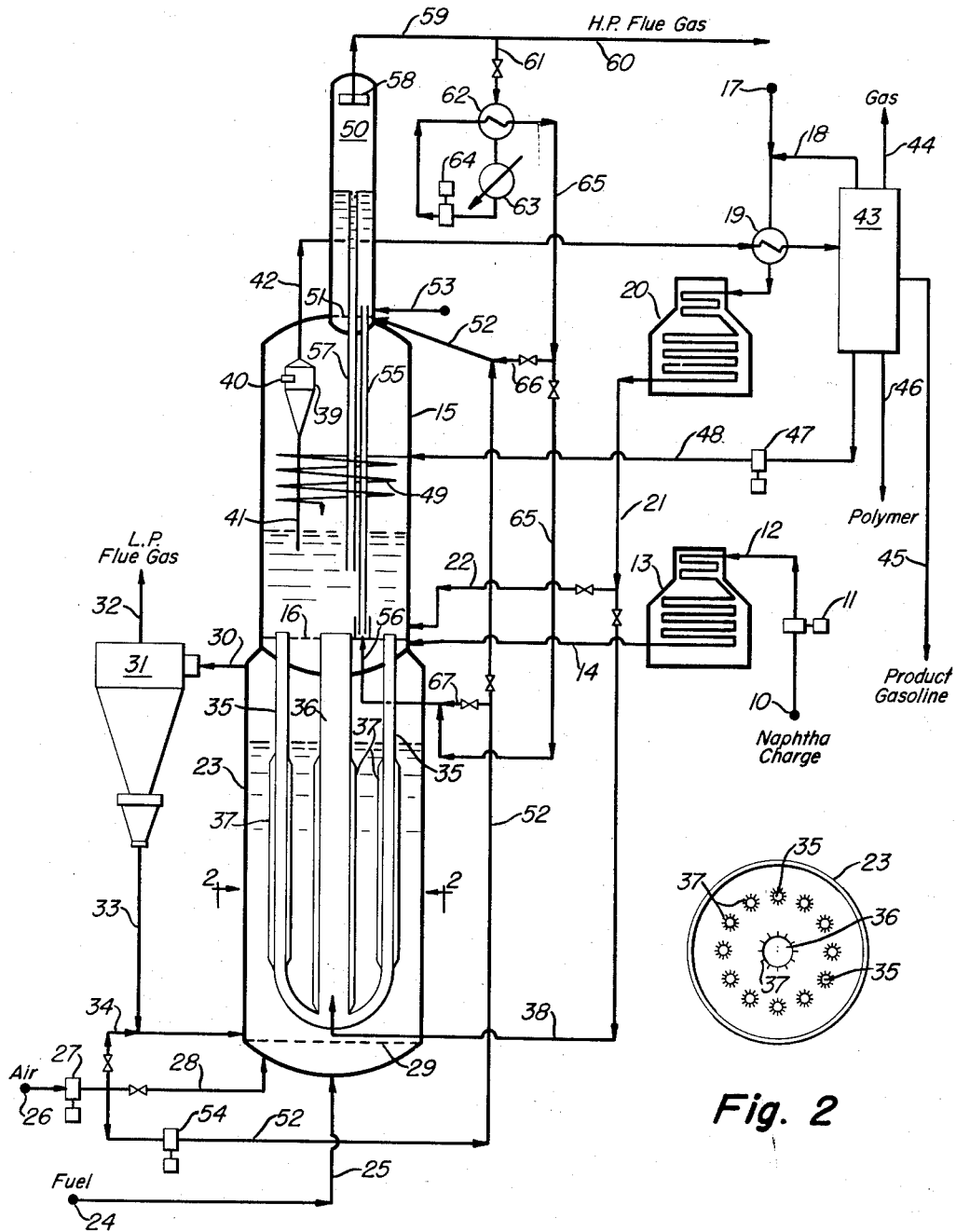
Figure 1 represents a diagrammatic elevation, partly a section, of an apparatus suitable for carrying out the invention.
Figure 2 is a cross-sectional cut taken on line 2—2 of Figure 1.

In this example the naphtha charge is a 58.2° API gravity mid-continent naphtha having an initial boiling point in ASTM distillation of 120° F., a 10 percent point of about 175° F., a 90 percent point of about 340° F. and a maximum of about 410° F. The charge contains only .05 weight percent sulfur and, in general, the sulfur content should be below about .1 percent. The charge has a clear F–1 octane number 46, F–2 octane number 45. The charge contains no olefins, about 40 percent naphthenes, 8 percent aromatic and 52 percent paraffins, all by volume.

Such charge, preferably after stripping for example with hydrogen to remove any moisture or H₂S which it might contain, is introduced from source 10 by pump 11 and line 12 to heater 13 wherein the charge is vaporized and heated to a temperature of about 950° F. at a transfer line pressure slightly above 200 p. s. i. g. The heated naptha then passes through transfer line 14 to the base of reactor 15 below distributor grid 16. Hydrogen from source 17 or a recycled hydrogen stream from line 18 is preheated to about 700° F. in exchanger 19 and heated in coils 20 to a temperature of about 1200° F. at which temperature such superheated hydrogen is introduced through lines 21 and 22 to a low point in the reactor, preferably through distributor (not shown) above grid 16. Alternatively the superheated hydrogen may be introduced below grid 16 and the preheated charge above this grid, it being desirable to prevent the charge and the hot hydrogen from contacting each other in the absence of the fluidized catalyst phase.

The catalyst is preferably one which has been prepared by contacting an aqueous solution of chloroplatinic acid containing from about 3.5 grams of platinum per liter with an ammonium sulfide solubilizing agent for converting the platinum into a solubilized form of platinum sulfide in a stable aqueous solution, then combining this true or colloidal solution with hydrous alumina prepared as taught in U. S. Reissue 22,196, the relative amounts of the two components being such as to produce a final catalyst containing about .3 to .5 percent or more of platinum by weight on a dry $Al_2O_3$ basis, the resulting mixture being then dried and calcined. The alumina may contain up to approximately 1 percent by weight of fluorine (although it is preferably fluorine-free) and it may contain a small amount of titania but it should be substantially free from sodium, iron and molydbenum oxides since the latter have been found to poison the resulting catalyst. Other methods of preparing the alumina base may be employed but best results are obtained by using an alumina of the highest purity obtainable. Also other methods may be employed for incorporating the platinum but since these form no part of the present invention, they will not be described in further detail. The catalyst should have a particle size in the range of about 1 to 200 microns chiefly of about 2 to 100 microns.

Reactor 15 in this example is 14 feet 3 inches inside diameter by 32 feet in height and is provided with an inner liner whose inside diameter is 13 feet 6 inches. The fluidized bed depth is preferably about 17 feet.

Directly under the reactor, which is a pressure vessel designed to be operated as high as 350 p. s. i. g., is a heater vessel 23 which is about 16 feet inside diameter by about 25 feet high and which is preferably provided with a liner of the type employed in catalytic cracking regenerators, the bottom of the reactor vessel constituting the top of the heater vessel. A bed of fluidized solids at a temperature of about 1200° F. is maintained at a depth of about 19 or 20 feet in heater vessel 23, the heat and fluidizing gas being supplied by combustion of fuel introduced from source 24 by line 25 and air introduced from source 26 by compressor 27 and line 28, the air and fuel preferably being introduced below distributor grid 29. About 5,000 cubic feet per minute of air (atmospheric pressure at 60° F.) may be required for this purpose and introduced at about 15 p. s. i. g. with sufficient fuel to supply the necessary heat. Hot flue gas is withdrawn from the top of heater vessel 23 by conduit 30 to cyclone separator 31 from which low pressure flue gas is vented through line 32 while the hot separated solids are returned by standpipe 33 for injection at the base of vessel 23 with a part of the compressed air from line 34.

From about 10 to 100 downflow tubes 35 extend from a point above grid 16 downwardly through vessel 23 to the base of a central riser tube 36. The diameter of downflow tubes 35 will depend on the number of tubes employed and may range from about 1.5 feet where 16 tubes are employed to about .43 foot where 80 such tubes are employed. The downflow tubes and the central riser tube are, of course, designed to withstand reactor pressure and, to increase heat transfer effectiveness, all of these tubes are preferably provided with vertical fins 37 about 16 feet in length, about 1 inch to 1½ inches in width and about .1 to .2 inch in thickness. The fluidized catalyst flowing downwardly in tubes 35 is preferably at a density of about 35 pounds per cubic foot while the catalyst density in the central riser tube 36 is about 33 pounds per cubic foot, this decrease in density being effected by introducing a hot recycled hydrogen at the base of the riser tube through line 38, the riser tube itself being about 3 to 4 feet inside diameter. The number of fins 37 on each downflow tube is about 15 to 75 depending on the tube diameter and about 75 to 150 fins are employed on the riser tube. With the design thus described about 2 to 3½ million pounds per hour of catalyst is circulated from the reactor through the tubes and riser back to the reactor and sufficient heat is thereby supplied for furnishing the endothermic heat of conversion.

The amount of hot recycle hydrogen from line 21 is in the range of about 2,000 to 10,000 cubic feet per barrel of charging stock and preferably about 5,000 cubic feet per barrel, the amount required for circulation of catalyst through the heater being introduced through line 38 and the rest being introduced through line 22 as hereinabove described. The fluidized catalyst bed in reactor 15 is thus maintained in the range of about 900 to 1000° F., for example, 940° F. The weight space velocity in the reactor in this example is approximately 2 pounds of charging stock introduced per hour per pound of catalyst in the reactor but it may be varied in the range of about 1 to 10. The preferred reactor pressure is 200 p. s. i. but the invention is applicable to operating pressures in the range of 100 to 350 p. s. i. g. or higher. The effluent product stream is withdrawn through a cyclone separator system diagrammatically shown by separator 39 having an inlet 40 and a dip leg 41 depending into the dense catalyst phase. Actually two sets of 2 stages of cyclone separation are desirable.

The effluent stream from the cyclone separation stage is withdrawn through line 42 and heat exchanger 19 to gas separation and product recovery system 43 wherein the recycle hydrogen stream is separated at about 170 p. s. i. g. and about 100° F. for return through line 18 as hereinabove described. $C_3$ and lighter gases are withdrawn through line 44 and a $C_4$—400° end point product gasoline through line 45 although the butanes may be withdrawn as a separate stream. Higher than gasoline materials, usually called "polymer" are withdrawn through line 46. Carry-over catalyst scrubbed out of the effluent product stream by a portion of such polymer is returned by pump 47 through line 48 to reactor 15. This slurry may amount to about 1400 barrels per day and since it is usually obtained at a temperature of about 400 to 450° F., it is desirable to heat this slurry before discharging it into the reactor. This may be accomplished by passing the slurry through coils 49 in the dilute phase section of the reactor so that the dilute phase is cooled and the returned slurry is heated to at least about 700 to 800° F. before it contacts the dense catalyst phase in the reactor. Preferably the slurry oil is vaporized before being discharged into the reactor.

After the catalyst has been on-stream for a number of days its activity and selectivity tend to decrease and in order to maintain both activity and selectivity at the desired high level, a regenerator-rejuvenator vessel 50 is superimposed above the reactor vessel 15 preferably with the base of vessel 50 forming a portion of the top of vessel 15. Vessel 50 is designed to withstand the same operating pressure as reactor 15 and it may be about 7.5 feet inside diameter by 30 feet in height and provided with the usual liner which is about 6 feet 10 inches inside diameter. Vessel 50 may be provided at its base with distributor grid 51 below which heated air is introduced through line 52 with sufficient fuel gas introduced through line 53 to maintain the regenerator-rejuvenator temperature at about 1000° F. The air for the regeneration and rejuvenation is supplied by compressor 54 which boosts the pressure of air discharged from compressor 27 to about 220 p. s. i. g. and discharges about 800 cubic feet per minute (measured at 60° F. and atmospheric pressure) of compressed air for introduction through line 52 as above described.

Catalyst is introduced from the reactor to the regenerator-rejuvenator vessel 50 through a vertical conduit 55 which extends from a point near the base of the reactor (or from a well depending from said reactor, not shown) to a low point in vessel 50 above distributor grid 51. Flue gas from line 56 serves as a lift or conveying gas for effecting catalyst transfer. Regenerated and rejuvenated catalyst is returned from vessel 50 to reactor 15 by vertical conduit 57 into which regenerated and rejuvenated catalyst flows at substantially the interface level in vessel 50 and from which such catalyst is discharged into the reactor dense phase below the interface level therein. Solids are removed from gases leaving the top of vessel 50 and filter 58 and the high pressure flue gas is withdrawn through line 59. A part of this high pressure flue gas is vented through line 60, preferably after its energy content has been utilized, and the remainder is passed by line 61 through heat exchanger 62 and cooler 63 to the inlet side of compressor 64 which pressures the flue gas to about 220 p. s. i. g., the repressured flue gas then being heated in exchanger 62 and passed by line 65 to line 56 to serve as the lift gas in vertical conduit 55. Part of this flue gas may be introduced by line 66 into the compressed air stream entering vessel 50 through line 52. Similarly a part of the compressed air from line 52 may be introduced by line 67 into the lift gas line 56. With the system thus described it will be seen that maximum flexibility is provided for controlling the rate of transfer of catalyst to the regenerator-rejuvenator vessel and also maintaining the temperature of the catalyst in said vessel 50. For effective rejuvenation an excess of oxygen should be introduced into vessel 50 over and above that required for simply removing carbonaceous deposits. This excess should be sufficient to give an oxygen partial pressure greater than .4 atmosphere and preferably at least about 1 atmosphere and for best results, to give a high pressure flue gas containing at least 5 mol percent uncombined oxygen and preferably at least 8 mol percent. The holding time of catalyst in the regenerator-rejuvenator vessel is preferably about .2 hour to 2 hours or more, i. e. at least 2 times as long as would be required for simply burning carbonaceous deposits.

The reforming plant hereinabove described is designed to produce from the defined charging stock about 6 weight percent of hydrogen and $C_3$ and higher hydrocarbons, about 93 weight percent of $C_3$-free 400° F. end point hydroformate and about 1 weight percent of higher boiling liquid "polymer" product, the coke usually amounting to less than .1 percent of the charging stock. Of the gases produced, about 90 mol percent is hydrogen and the remainder about equal number percents of $C_1$, $C_2$ and $C_3$ hydrocarbons. Of the hydroformate about 2 percent is isobutane, 3 percent normal butane and 95 percent $C_5$—400° F. gasoline having an API gravity of about 48.6°, an F-1 clear octane number of about 93, an initial ASTM boiling point of about 115° F., 10 percent point of 165° F., 50 percent point of 255° F. and 90 percent point of 340° F. The so-called polymer has an API gravity of about 11° and boils in the range of about 420 to 700° F.

It will be observed from the foregoing that a remarkably simple, flexible and efficient fluidized platinum catalyst system has been provided for effecting naphtha reforming and that the problem of supplying heat to the reactor has been solved. We have thus accomplished the objects of the invention and while we have illustrated a specific example thereof, it should be understood that alternative arrangements, operating conditions and procedures will be apparent from the above description to those skilled in the art.

It should be noted that the preheating of recycle slurry in coil 49 above the dense phase catalyst bed in the reactor avoids undue cooling of the catalyst bed and thus contributes to our objective of supplying the necessary heat thereto. In other words, the total amount of heat which must be added to the reactor is minimized by avoiding introduction into the dense catalyst phase any unvaporized slurry oil or relatively cool catalyst. In our system we not only avoid heat loss in the catalyst bed but we utilize the sensible heat in product gases and vapors for vaporizing the slurry oil and preheating the recycled catalyst which is returned to the reactor, the vaporized slurry oil being carried overhead with product gases and vapors without passing through any part of the catalyst bed.

Instead of employing coil 49 in the dilute phase at the top of the reactor we may disperse the slurry oil directly in reaction products at the top of the reactor provided that the dispersing means is designed to prevent unvaporized slurry oil droplets from reaching the dense catalyst phase. The slurry oil may be sprayed upwardly against a dish shaped baffle and a series of inclined baffles may be interposed below the dish shaped baffle to distribute any unvaporized oil droplets and insure their complete vaporization. A vaned disc distributor may be employed with or without auxiliary baffles to disperse the slurry oil and insure its complete vaporization and direct contact with ascending product vapors. An auxiliary upper fluidized solids catalyst bed may be employed in the upper part of the reactor, all product gases flowing through the auxiliary bed for keeping it fluidized and supplying heat and the slurry being introduced above the auxiliary bed so that the slurry oil is vaporized and the catalyst is reheated before such catalyst is returned by suitable vertical conduit means to the dense catalyst phase in the reactor. If such an auxiliary catalyst bed is employed it is preferably supplied with hot regenerated or rejuvenated catalyst somewhat coarser in catalyst size than the catalyst fines recycled with slurry oil. These alternative systems are not illustrated in the drawings but are examples of alternative methods and means for minimizing heat loss in the dense catalyst phase thus contributing to the main objective of supplying the required heat of reaction.

Instead of employing a multiplicity of downflow tubes 35 and single upflow riser 36, it should be understood that a multiplicity of U-tubes may be employed or bayonet type exchangers in which catalyst flows downwardly through an annulus and upwardly through an inner riser. A single downflow tube may be employed provided it is sufficiently corrugated or star shaped to provide the necessary heat transfer area. The low pressure fluidized solids heating zone may be superimposed above the high pressure conversion zone and the fluidized solids heat transfer medium at about 1200° F. may flow downwardly through heat exchange tubes and a vertical central riser in the high pressure reaction vessel. In fact, a circulating fluidized solids heating circuit may be entirely enclosed within the high pressure reactor vessel. These various modifications, however, are not equivalent from an engineering standpoint and the modification illustrated in the drawing offers construction and control advantages over these other modifications which are not illustrated in the drawings.

The regeneration-rejuvenation portion of the system has been described in a simplified manner, and it should be understood that a two vessel regenerator and rejuvenator may be used with suitable stripping, aeration and safety features known to those skilled in the art of designing, building and operating pressure fluidized solids contacting systems.

The temperatures hereinabove described for effecting conversion are those suitable for platinum-on-alumina catalysts which contain no added fluorine; when such catalysts contain, for example, as much as .5 percent of added fluorine the conversion temperature may be lowered by as much as 50° F.

We claim:

1. A fluidized platinum catalyst hydrocarbon reforming system which comprises a high pressure fluidized solids reactor vessel, a low pressure fluidized solids heating vessel below said reactor vessel, a distributor grid at the base of the reactor vessel, high pressure catalyst circulation tubes extending through the base of the reactor vessel on the top of said heating vessel for withdrawing catalyst above said grid, circulating it through said high pressure tubes in the heating vessel and returning it above said grid, connections for introducing air and fuel respectively at the base of said heating vessel, a low pressure cyclone separator, connections for introducing flue gas from the heater vessel to the cyclone separator and for returning separated solids therefrom to the heating vessel and venting low pressure flue gas and a connection for introducing hot hydrogen into at least one of said high pressure tubes for lifting catalyst therein upwardly to the reactor vessel and thereby causing catalyst circulation from the reactor vessel through said tubes and back to the reactor vessel.

2. The system of claim 1 which includes heat transfer vertical fins on that portion of said high pressure tubes which is immersed in fluidized solids in the low pressure heating vessel.

3. The system of claim 1 which includes a distributor grid at the base of the heating vessel, connections for introducing air and fuel below said distributor grid and a connection for returning separated solids to said low pressure reactor above said distributor grid.

4. The system of claim 1 which includes a high pressure regenerator vessel superimposed above the reactor vessel, a first vertical conduit extending from a low point in the reactor vessel through the top wall thereof and the bottom wall of the regenerator vessel and discharging at a low level in the regenerator vessel, a connection for introducing a carrier gas at the base of said first vertical conduit, a second vertical conduit extending from a higher level in the reactor to a higher level in the regenerator for returning regenerated catalyst from the regenerator to the reactor, a catalyst separator at the top of said regenerator, a connection for withdrawing high pressure flue gas substantially free from catalyst from said separator and regenerator and a connection for introducing regeneration gas at the base of said regenerator.

5. The system of claim 4 which includes a heat exchanger, cooler, compressor and connections for passing high pressure flue gas through said heat exchanger and cooler to said compressor and thence through said heat exchanger for introduction to said regenerator and to said gas lift connection.

6. The system of claim 4 which includes a connection for introducing fuel gas at the base of said regenerator.

7. A fluidized platinum catalyst system for reforming hydrocarbons of the naphtha boiling range wherein solids are carried from a reaction zone in effluent products, scrubbed from said products and recycled to the reaction in a slurry oil, the method of minimizing required heat input to the dense catalyst phase in the reaction zone which method comprises contacting recycled slurry oil containing catalyst particles with hot reaction products downstream of the dense catalyst phase for cooling said reaction products, vaporizing said slurry oil and preheating catalyst carried by said slurry oil, carrying said vaporized slurry oil with said reaction products to a product recovery system and returning the preheated catalyst particles to said dense phase.

8. The method of claim 7 in which the contacting is effected by indirect heat exchange.

9. The method of claim 7 wherein most of the required heat input to the dense catalyst phase in the reaction zone is supplied thereto by burning an extraneous fuel with air in direct contact with fluidized heat exchange solids out of direct contact with the fluidized catalyst solids and circulating one of said fluidized solids in indirect contact with the other of said fluidized solids, said fluidized heat exchange solids being maintained at a lower pressure than the fluidized catalysts solids.

10. The apparatus of claim 1 which includes a vaporizing coil in the upper part of the reactor vessel and an inlet for introducing a slurry oil into said coil, the outlet of said coil discharging slurry oil vapors in preheated catalyst above dense phase catalyst in the reactor.

References Cited in the file of this patent

UNITED STATES PATENTS

| | | |
|---|---|---|
| 2,185,929 | Simpson et al. | Jan. 2, 1940 |
| 2,363,874 | Krebs | Nov. 28, 1944 |
| 2,472,844 | Munday et al. | June 14, 1949 |
| 2,478,916 | Haensel | Aug. 16, 1949 |
| 2,479,110 | Haensel | Aug. 16, 1949 |
| 2,492,948 | Berger | Jan. 3, 1950 |
| 2,541,077 | Leffer | Feb. 13, 1951 |
| 2,557,680 | Odell | June 19, 1951 |
| 2,663,622 | Odell et al. | Dec. 22, 1953 |